F. W. Robinson,
Drag Saw.
N° 49,791.            Patented Sep. 5, 1865.
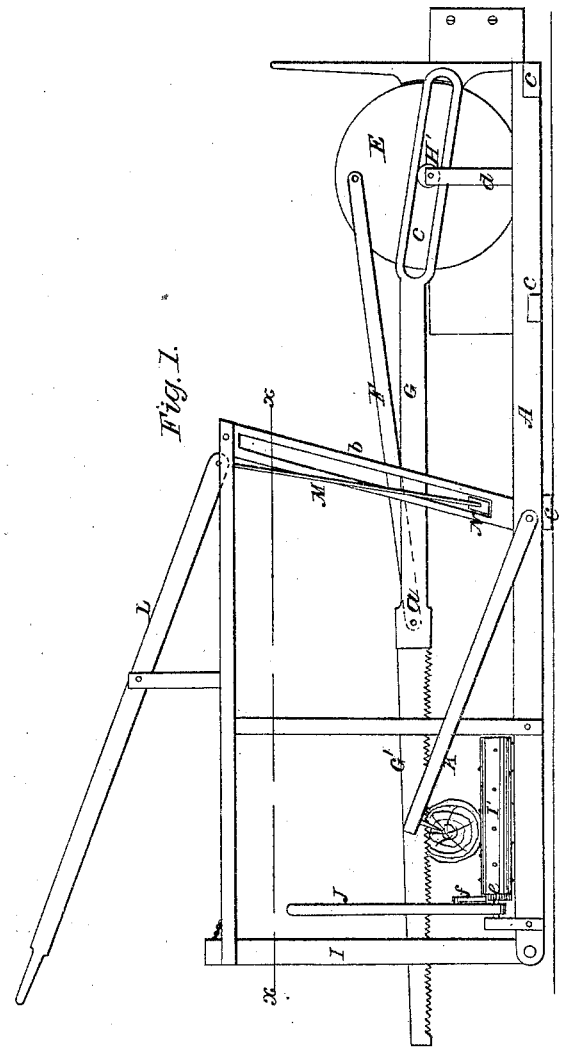
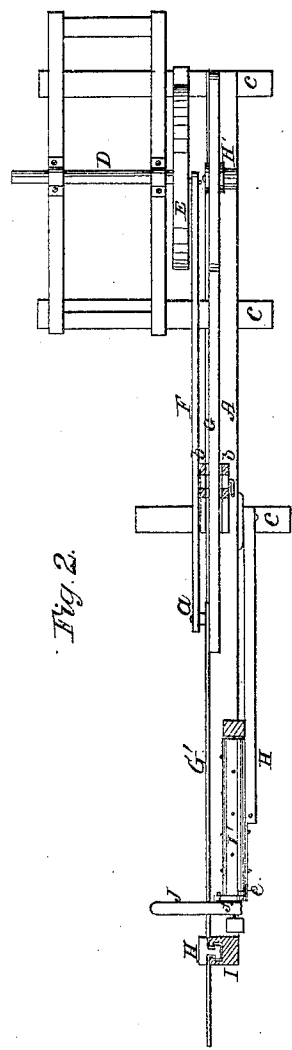
Witnesses:
Inventor:

UNITED STATES PATENT OFFICE.

F. W. ROBINSON, OF RICHMOND, INDIANA.

IMPROVEMENT IN SAWING-MACHINES.

Specification forming part of Letters Patent No. 49,791, dated September 5, 1865.

*To all whom it may concern:*

Be it known that I, F. W. ROBINSON, of Richmond, in the county of Wayne and State of Indiana, have invented a new and Improved Crosscut or Drag Saw; and I do hereby declare that the following is a full, clear, and exact description thereof, which will enable others skilled in the art to make and use the same, reference being had to the accompanying drawings, forming part of this specification.

This invention relates to a machine of simple construction for sawing wood or logs transversely with the grain, and is more especially designed for sawing cord or fire wood by horsepower.

The object of the invention is to obtain a simple device for the purpose specified, one which may be cheaply constructed and not liable to get out of repair or become deranged by use.

The distinctive feature of the invention consists in the means employed for giving the downward pressure to the saw, whereby the excessive friction attending the plans now employed for that purpose is avoided.

In the accompanying drawings, Figure 1 is a side view of my invention; Fig. 2, a horizontal section of the same, taken in the line $x$ $x$, Fig. 1.

Similar letters of reference indicate like parts.

A represents a bar, which rests upon transverse bars C and forms the base of the framing of the machine.

D is a driving-shaft, having upon it a crank-pulley, E, to which a pitman, F, is attached. This pitman is connected to the saw-bar G at its front end, and at the butt or heel of the saw G', as shown at $a$.

The saw-bar G works between guides $b\ b$ attached to the bar A, and the saw has a guide, H, resting on its back or upper edge, said guide being fitted in a groove made in a ratchet-bar, I, attached to the bar A or base of the machine. The saw-bar G inclines downward at its rear end, as shown clearly in Fig. 1, and said inclined part has a slot, $c$, made in it extending its whole length, in which slot a roller, H', on an upright, $d$, attached to the base-bar is fitted.

I' is a toothed roller on which the log to be sawed rests, said roller having a parallel position with the saw, and a ratchet, $e$, at one end of it, with which a pawl, $f$, on a lever, J, engages for the purpose of feeding the log along underneath the saw after the termination of each cut. The log, while being sawed, is held in position by a dog, K, as shown in Fig. 1.

The saw is raised and retained above the log, when the latter is being moved along underneath, it by means of a lever, L, which is connected by a rod, M, with a slide, N, which works in the guide-bars $b\ b$.

The inclined part of the saw-bar G, working on the roller H', gives the rock to the saw, while the connecting of the pitman F to the saw-bar G at the heel or butt of the saw gives a downward pressure to the saw, driving its forward and backward cutting strokes, said pressure keeping the saw to its work so that it will feed itself as it cuts, the crank-wheel being run in the proper direction, the top toward the saw.

Thus by this simple means I avoid the use of slides and cross-heads working in right lines, hitherto used in sawing devices of this kind, and which occasion a great deal of friction. In my invention there is no more friction produced than is caused by the weight of the saw-bar G on the roller H'.

I would remark that inclined or "dipped" slides and a cross-head may be used in my invention at the end of the saw-bar G, instead of the single roller H' and inclined slotted end of G. The same end would be attained in either case.

I claim as new and desire to secure by Letters Patent—

The combination of the bent and slotted saw-bar G, fixed roller H', crank or wrist-wheel E and pitman F, as and for the purpose described.

F. W. ROBINSON.

Witnesses:
JOHN FINLEY,
JONAS W. LEO.